Oct. 9, 1956
A. H. BRUSH
2,765,697
EXPANSIBLE, KNURLED AND LONGITUDINALLY
SLOTTED SCREW SEAT INSERT
Filed Jan. 5, 1953
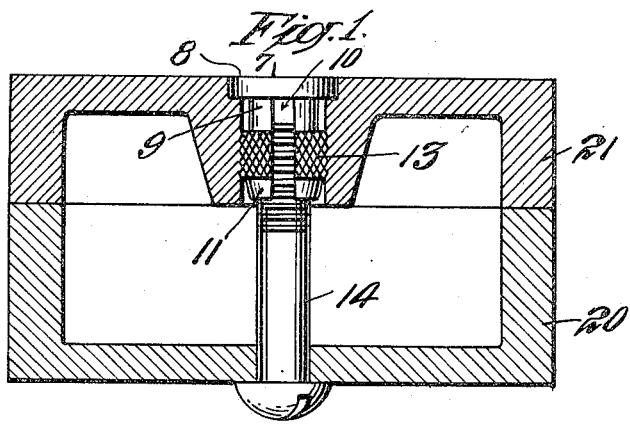
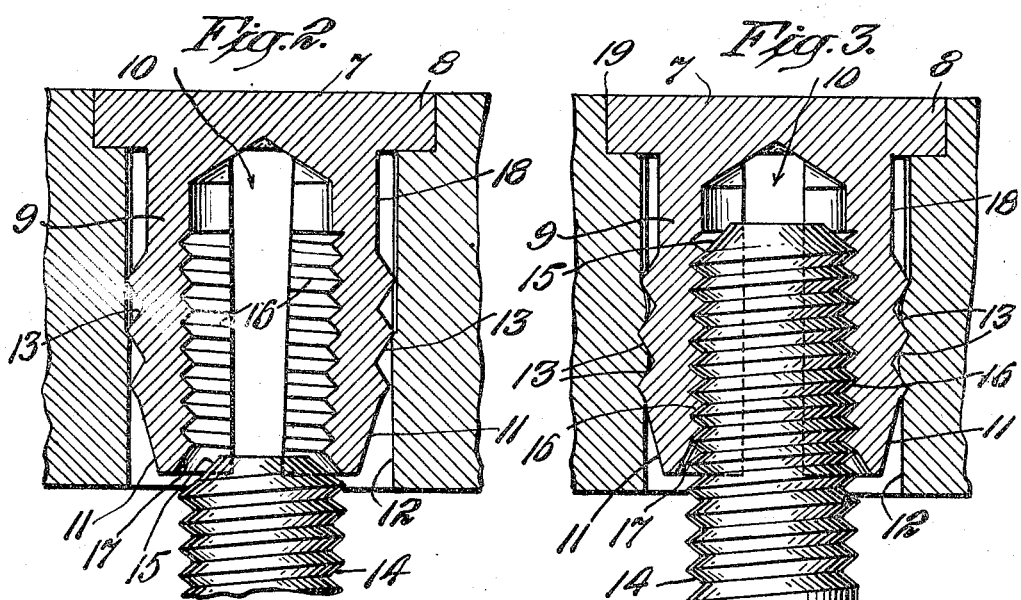
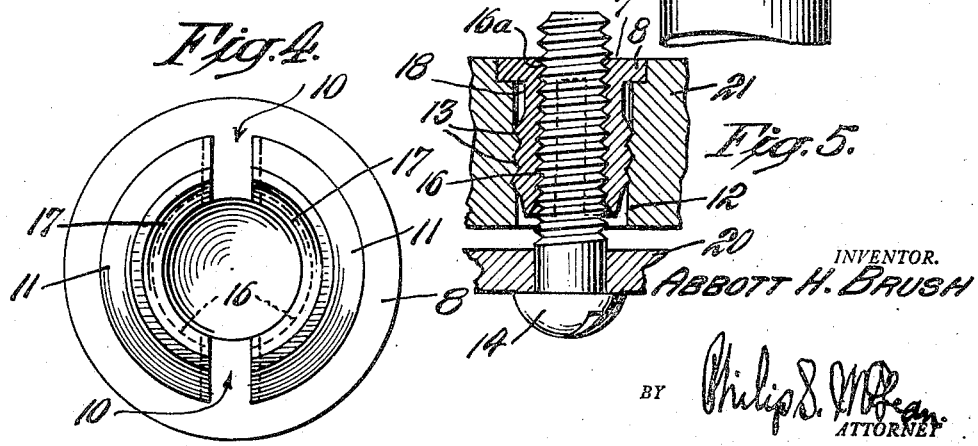
INVENTOR.
ABBOTT H. BRUSH
BY Philip S. McBean
ATTORNEY United States Patent Office 2,765,697
Patented Oct. 9, 1956

2,765,697

EXPANSIBLE, KNURLED AND LONGITUDINALLY SLOTTED SCREW SEAT INSERT

Abbott H. Brush, Greenwich, Conn., assignor to Norman Jay Boots, Stamford, Conn.

Application January 5, 1953, Serial No. 329,567

1 Claim. (Cl. 85—2.4)

The invention herein disclosed relates to screw seat inserts of the type covered in Abbott P. Brush Patents 2,393,606 of January 29, 1946 and 2,448,351 of August 31, 1948, and embodying internally screw-threaded split tubular studs adapted to be collapsed when driven into the seats provided for the same and to be then expanded into fully locked relation on the entry of the screws therein.

Special objects of the present invention are to provide a tapped fastener of this type which will be capable of carrying heavy loads and which will not pull out under heavy loading or under the so-called wheel pulling effect of the screw engaged in the insert.

Other special objects of the invention are to provide a screw seat insert which will offer high torque resistance to the turning of the screw and which at the same time will not require a great degree of expansion to lock it in the hole. Inserts of such characteristics are particularly useful in hard materials such as the plastics and metals.

Another special object of the invention is to afford a screw seat insert providing the effect of a tapped hole which may be so readily insertable as to be capable of being located in the seat provided for it by simple hand pressure, without requiring heavy driving action such as might injure or crack hard, brittle materials.

A further special object is to provide a screw seat insert which may be closed at the inner end, thus to seal off a hole or passage in which the insert may be seated.

Other desirable objects and special features of the invention are set forth and will appear in the course of the following specification.

The drawing accompanying and forming part of the specification illustrates a present practical embodiment of the invention. Structure, however, may be modified and changed as regards the immediate illustration, all within the true intent and scope of the invention as hereinafter defined and claimed.

Fig. 1 in the drawing is a sectional view showing one of the screw seat inserts in use for securing two hollow box-like parts together and capable of taking all the load that the screw may apply for forcibly drawing these parts together;

Fig. 2 is an enlarged broken sectional detail showing the screw seat insert pressed into its seat in the back of the member and the entering end of the screw about to engage the screw threads in the forward, collapsed end of the insert.

In this position the insert is lightly held against rotation and against end pressure of the screw.

Fig. 3 is a similar view showing the screw entered in the insert and the insert expanded into fully anchored relation in the hole;

Fig. 4 is an end view showing the insert as it appears in Fig. 2 in the partly collapsed relation ready to receive the entering end of the screw.

Fig. 5 is a broken sectional view showing the insert modified to provide a tapped hole extending entirely through the same.

The insert of the present invention differs from prior constructions in having means for locking it against turning or withdrawal without collapsing it to any considerable extent and thus leaving the insert, when seated, in condition for the screw to enter the split end to effect the complete expansion of the device.

With this arrangement, with the screw pulling the insert deeper into the hole in which it is seated, the load may be carried by an outstanding flange on the unsplit end of the insert, and this may be a closed or blind end since there is ordinarily no need for the screw to extend through the same.

In the illustration the insert is shown as a tubular stud having an unsplit inner end 7 extended as an annular load carrying flange 8 and with the tubular shank portion 9 split at 10 practically all the way back to the closed head.

The two segmental portions of the split shank are shown as externally beveled at 11 to guide the device into the seat or opening 12 provided for it, and as having a band or more or less sharp pointed diamond knurling 13 above the beveled or tapered portion.

This knurled band or ring about the shank of the insert provides an extended grip which will hold the insert in place firmly against rotative or longitudinal movement with relatively little expansive force.

This makes it possible for the insert and the hole in which it is to be used, to be very nearly the same size.

This feature is illustrated in Fig. 2, where it will be noted that the hole 12 is only slightly smaller than the external diameter of the knurled portion 13.

This means that the insert may be pushed down in its seat with very little effort and without collapsing it to any great extent, and this means in turn that with such slight collapsing action the screw which is shown at 14 may be entered in the partially collapsed split end of the insert.

The inner end of the screw is indicated as tapered at 15 to readily enter between the segments and engage the screw threads 16 of the latter, and these segments are shown as flared at 17 to afford easy entrance of the screw into engagement with the threaded portions.

The tubular shank portion may be reduced in outside diameter, above the knurled portion, as indicated at 18, to impart flexibility and facilitate the placing and expansion of the insert in the hole.

The taper or pointing of the screw gives the screw sufficient lead to enter and engage the screw threads in the partially collapsed split end of the insert, and Fig. 3 shows how the screw then serves to expand the split portions and fully embed or interlock the knurled strip in the surrounding wall of the hole.

The screw may be tightened as much as desired without any possibility of pulling the insert out of the hole, since the longitudinal pull on the insert is carried by the outstanding flange 8 which has a bearing on the solid material surrounding the hole.

This load carrying flange may be of any desired shape or size and may rest flat on top of the material or be seated in a countersunk recess 19, as indicated.

Additional strength is gained by the closed character of this head, and this closed head may serve the further purpose of keeping out moisture or the like.

Fig. 1 shows how the invention may be used for solidly securing two box-like members 20, 21, together, with the screw inserted through the front member and the insert seated in the opening provided for the same in the back of the back member.

In effecting the expansion of the split shank the screw is gripped and frictionally held by the split portions.

The diamond or other shaped knurls will ordinarily bite into and become embedded in the surrounding material, but if used in particularly hard material the points or edges of the knurls may be flattened down to some extent. In either event, however, a firm, positive interlock between the insert and the material is obtained with a relatively small degree of expansion.

The knurled band about the split insert holds the insert against turning and against dropping out of the hole before the screw is inserted, an important practical feature saving time and annoyance in placing the insert and when afterwards assembling the parts with which the device is used.

The sharp edges provided by the split 10 aid in securing the insert against rotation, as in the prior patents mentioned, but because of the relatively slight contraction and expansion this holding force is not as great as in the patents. The knurled band about the split segments, however, more than makes up for any loss in holding at the cut edges of the split.

Where it is not essential or particularly desirable that the head end of the insert be closed, the screw threading 16 may be extended on through the head as a continuous tapped hole, as indicated at 16a in Fig. 5. This structure permits the use of a longer screw, one which may be long enough to extend entirely through the insert, and this arrangement may be preferred where it may be desired to utilize the protruding end of the screw for supporting, fastening or other purposes.

Also, in cases where the section holding the insert is quite thin it may be necessary to make the insert so short that it would not be practical to tap a blind hole, or so short that it would not provide sufficient threads if it was tapped blind.

The invention therefore contemplates that the insert may be tapped with a blind hole or the screw threads be extended entirely through the head.

While special pointed screws may be used to more readily enter between the collapsed segments of the insert, and such might be preferred where the insert has been forced into a smaller hole and therefore collapsed to a greater extent, it is ordinarily practicable to use plain standard screws, since these are ordinarily given sufficient taper or lead to enter between and engage the screw threads in the partially collapsed segments.

What is claimed is:

A non-rotating and non-pull-out slightly expansible screw seat providing insert for use in plastics, metals and like hard materials limiting the extent of possible expansion and comprising a substantially cylindrical tubular stud having a complete unsplit annular projecting flange at the inner end of the same providing a continuous abutment shoulder preventing the insert being pulled out of a seat in which it has been entered, the intermediate portion of said substantially cylindrical stud between said flange and the inner end of the stud having a reduced flexible portion adjoining the flange and a band of sharp pointed, diagonal diamond knurls adjoining said reduced flexible portion, the interior of said tubular stud being screw-threaded to the same diameter from the outer end toward the inner flanged end of the stud and said stud being split inwardly from the opposite end through the reduced flexible portion substantially to said flanged end, into opposed, internally screw-threaded segments connected together only by said flanged end of the stud and relatively flexible about said reduced flexible portion to collapse sufficiently for entry of the generally cylindrical stud into an opening of slightly less diameter, and a screw having a constant diameter thread entered in the outer end of said insert and of a size to restore the insert from slightly collapsed formation to original, substantially cylindrical dimensions, the outer end of the stud being externally tapered to readily enter a hole of smaller size without unduly collapsing the threaded flexibly connected segments and internally beveled to enable engagement of a constant thread screw with the screw threaded segments in the slightly contracted relation and whereby the band of sharp pointed knurls will hold the insert against turning sufficiently for operative engagement of the screw.

References Cited in the file of this patent

UNITED STATES PATENTS

| | | |
|---|---|---|
| 859,532 | Swortfiger | July 9, 1907 |
| 1,833,554 | Baynes | Nov. 24, 1931 |
| 1,978,935 | Douglas | Oct. 30, 1934 |
| 2,026,686 | Kirley | Jan. 7, 1936 |
| 2,386,922 | Andrews | Oct. 16, 1945 |
| 2,490,594 | Madden | Dec. 6, 1949 |

FOREIGN PATENTS

| | | |
|---|---|---|
| 22,938 | Great Britain | of 1900 |

OTHER REFERENCES

Dodge Expanding Insert Brochure, Rec'd. in Division 57, November 9, 1948, Phelps Manufacturing Co., Waterbury, Conn. (Copy in 85/214.)